March 17, 1959  R. J. PIOCH  2,878,026
CHUCK FOR ATTACHING PIPE FITTINGS AND THE LIKE
Filed Sept. 20, 1957  5 Sheets-Sheet 1

INVENTOR.
Robert J. Pioch
BY
Harness, Dickey & Pierce
ATTORNEYS

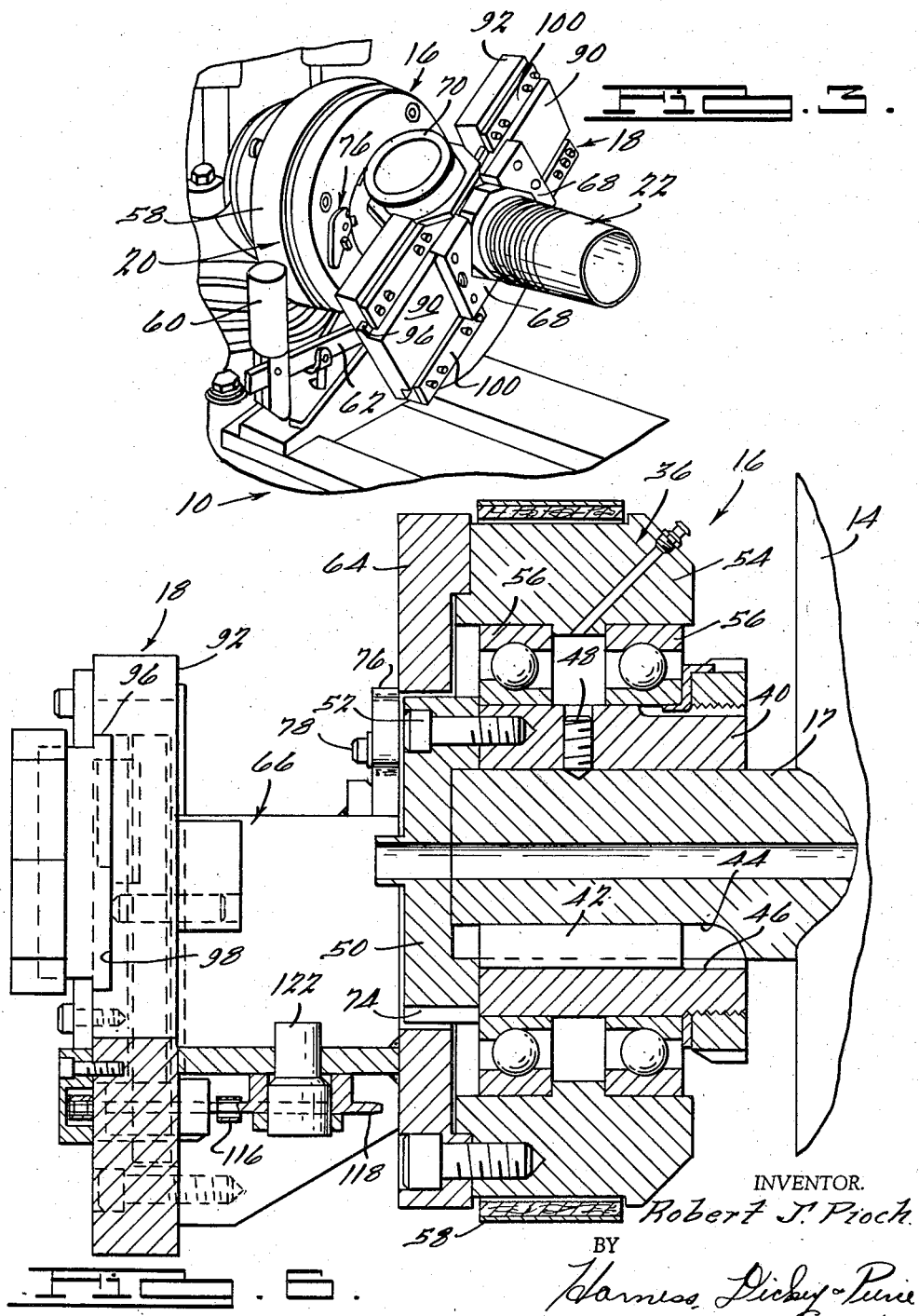

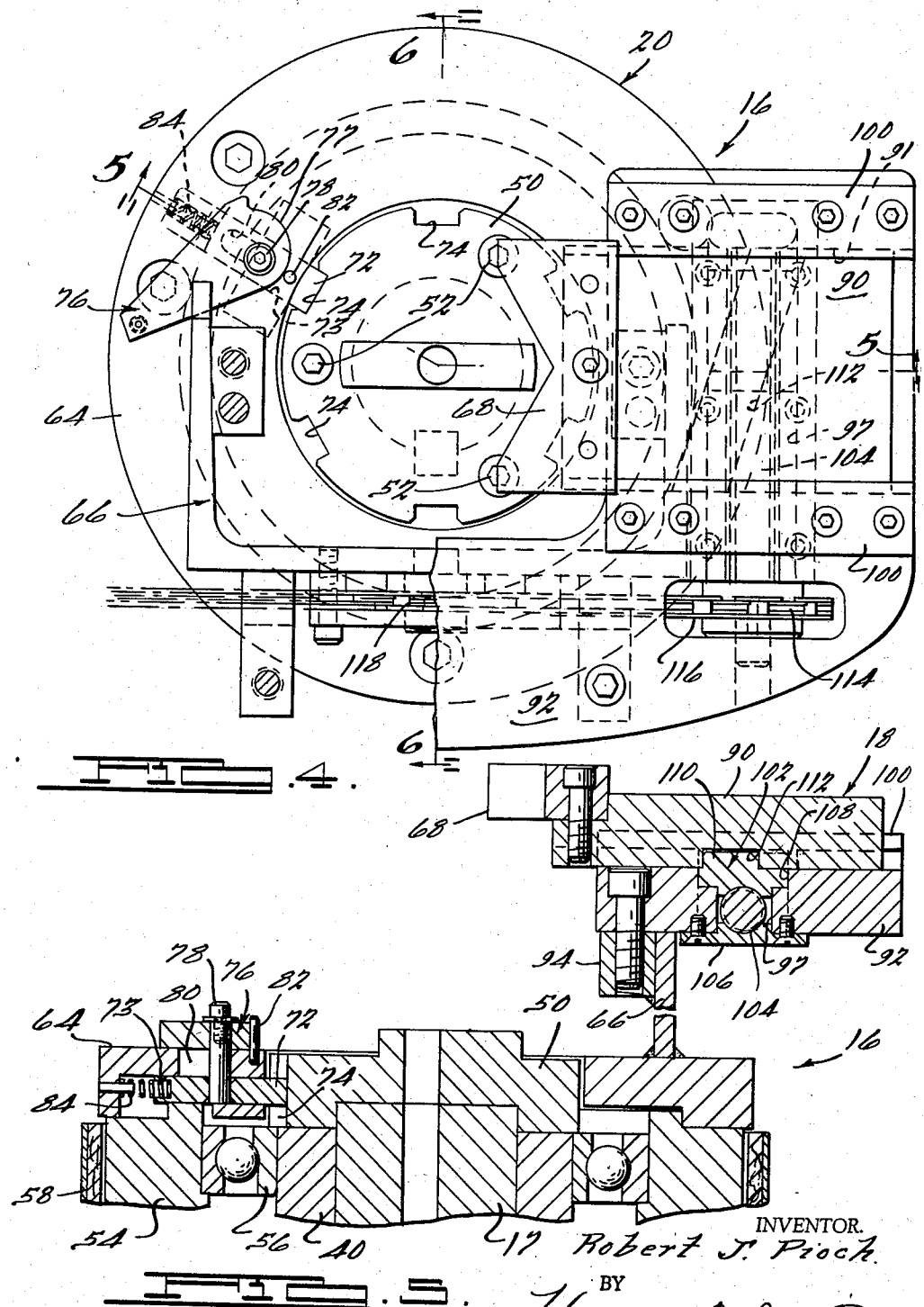

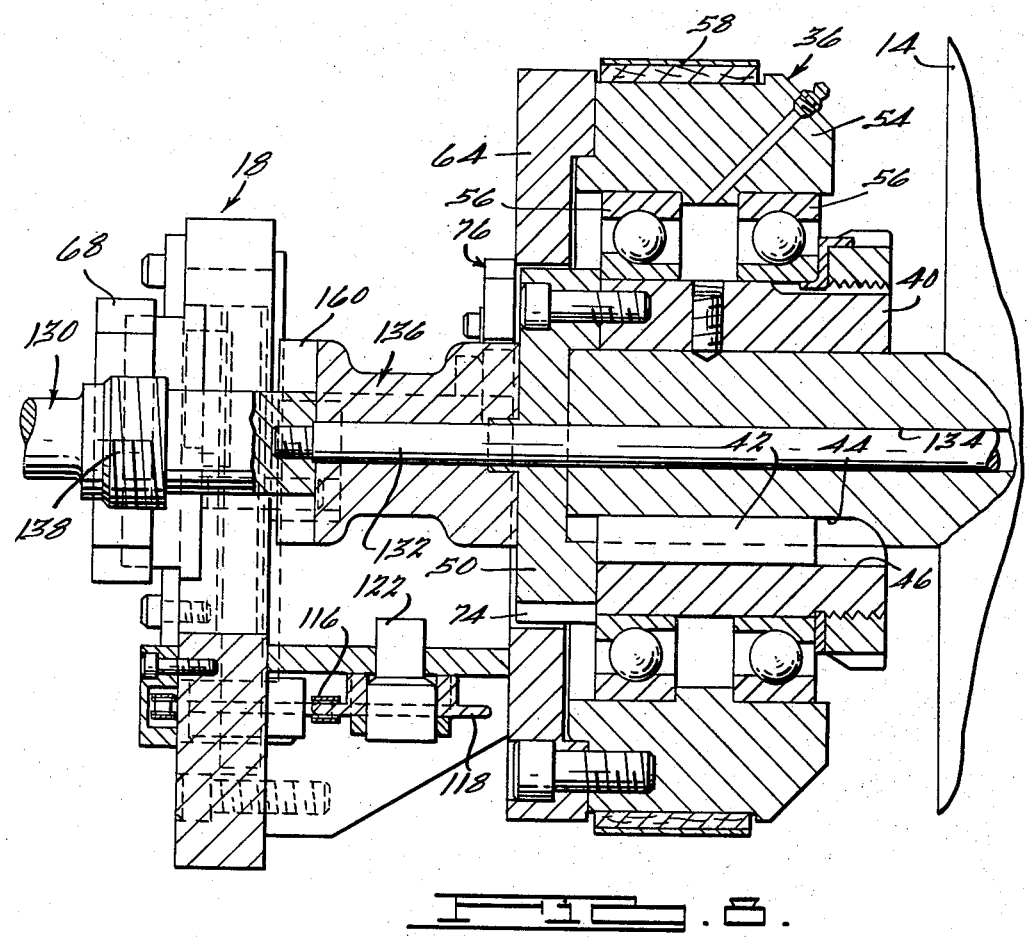
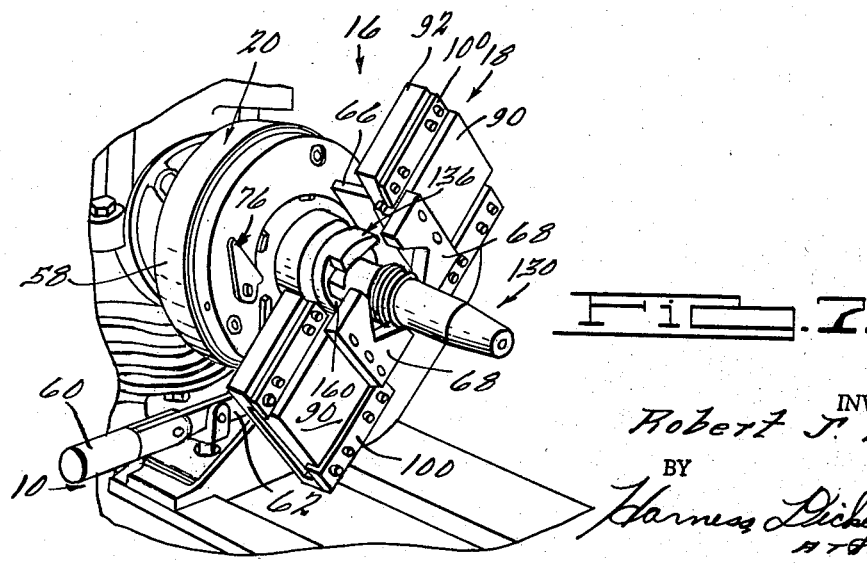

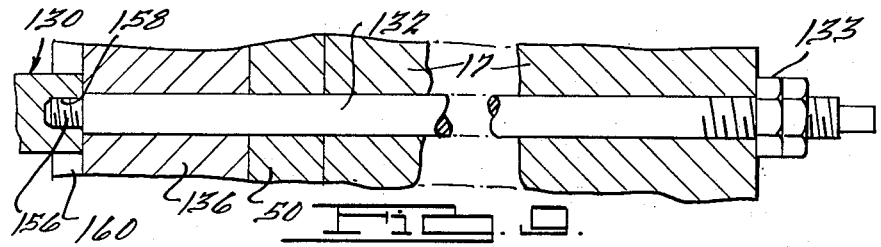
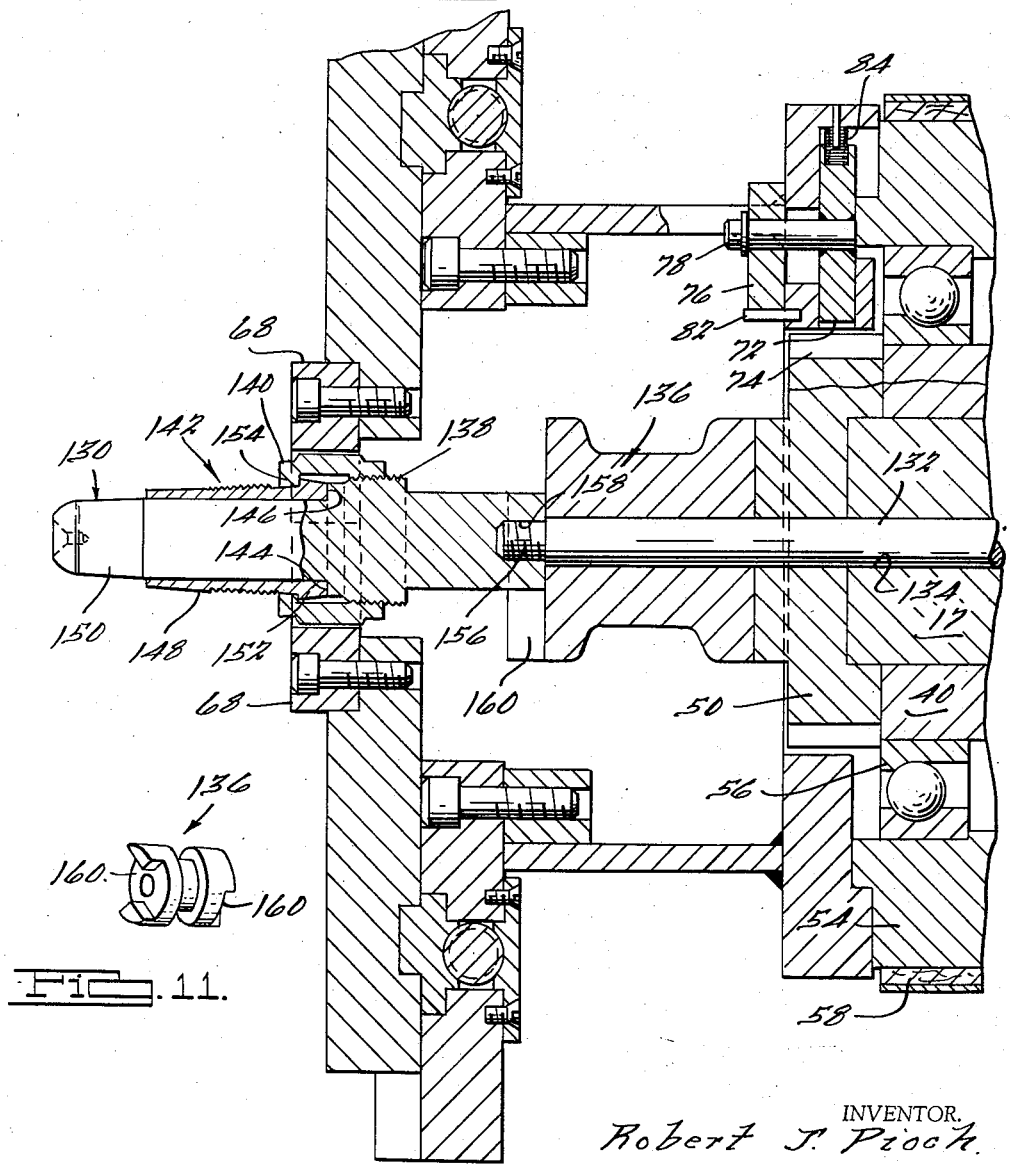

United States Patent Office 2,878,026
Patented Mar. 17, 1959

2,878,026

CHUCK FOR ATTACHING PIPE FITTINGS AND THE LIKE

Robert J. Pioch, Jackson, Mich.

Application September 20, 1957, Serial No. 685,211

8 Claims. (Cl. 279—7)

The present invention relates to an improved chuck, and more particularly to an improved chuck for attaching terminal fittings of various different types to tubular members, and particularly to high pressure hoses.

The chuck of the present invention is capable of handling both of the commonly used types of high pressure hose fittings, namely, those having a grippable portion integral with the threaded portion which is to be threaded into the hose socket, and those of the so-called swivel nut type that carry a free spinning nut at one end and do not have a clear area by which they may be gripped. The chuck is relatively light and compact, and is quickly convertible for use alternately with fittings of either type. It is of particular advantage in portable installations where a minimum number of different machines and tools are desired, yet where fittings of both types must be handled.

Accordingly, one important object of the present invention is to provide an improved chuck of compact, relatively light weight construction capable of handling a wide variety of different types of fittings.

Another object is to provide an improved chuck for screw attaching fittings of both of the presently used types, including those in which the threaded nipple may be directly gripped and those that carry a swivel nut positioned close to the threaded portion of the nipple so that the nipple cannot be gripped directly for turning it.

Another object is to provide an improved chuck for screw attaching fittings and the like, and including a two-piece body for mounting upon the spindle or the like of a machine, one of the pieces of the body being rotatable with respect to the other and carrying a clamping jaw assembly spaced outwardly from the body, and further including means for locking the two pieces of the body for rotation together, either directly through a releasable coupling or through a fitting of the swivel nut type.

These, and other objects and advantages, which will be more specifically pointed out or will otherwise become apparent upon a reading of the following description are accomplished by the present invention, one embodiment of which comprises a chuck including a body having an inner member adapted to be securely fixed to the spindle of a machine, and an outer member mounted rotatably upon the inner member. The outer member carries a pair of clamping jaws spaced forwardly from the body to provide a space between the jaws and the body to accommodate the distal portion of a curved fitting held by the jaws, which portion would not fit within the body. Releasable coupling means are provided for locking the inner and outer members together so that the outer member may be directly rotated by the inner member. When used for attaching fittings of the directly grippable type, the inner and outer members are locked together and the chuck is used in the conventional manner, the fittings being gripped by the outspaced jaws and turned into a hose socket or the other threaded receptacle.

For use with fittings of the swivel nut type, the two body members are uncoupled from each other, and a mandrel is mounted for rotational drive by the inner member. This mandrel is externally threaded to fit the internal threads of the swivel nut of the fitting, which nut is held in the jaw assembly. The outer body member is braked to restrain the jaw assembly against rotation while the inner member is rotated to turn the mandrel into the nut. The mandrel has a shoulder positioned to engage the terminal flange of the nipple which lies within the nut, and is turned into the nut until the shoulder engages the flange and binds thereagainst sufficiently to overcome the brake, whereupon the clamping jaws are turned, together with the outer body member, by the inner body member through the mandrel and the fitting. The swivel nut fitting is thus secured in the chuck and may be turned thereby into the hose socket. The nipple is driven directly by the mandrel through frictional engagement of the mandrel shoulder against the flange of the nipple. Any desired degree of torque may be provided in this manner by controlling the torque applied to turn the mandrel into the nut.

The invention will now be described in greater detail in connection with the accompanying drawing of which:

Fig. 3 is a view generally similar to the view of Fig. 2, showing the chuck with a fitting of the type having a directly grippable nipple;

Fig. 4 is a front elevational view with parts broken away of the chuck as shown in Fig. 2;

Fig. 5 is a sectional view of the chuck as shown in Fig. 4, taken along the section line 5—5 thereof;

Fig. 6 is a longitudinal sectional view of the chuck as shown in Fig. 4, taken along the section line 6—6 thereof;

Fig. 7 is a fragmentary, perspective view of the machine shown in Fig. 1, showing the chuck prepared for use with a fitting of the swivel nut type;

Fig. 8 is a longitudinal sectional view, partly in elevation, of the chuck shown in Fig. 7, being generally similar to the view of Fig. 6, but showing the chuck arranged for attaching a swivel nut fitting;

Fig. 9 is a fragmentary, longtiudinal sectional view of the chuck as shown in Fig. 7, taken along substantially the same section line as Fig. 8, but particularly showing details of the shaft that supports the mandrel;

Fig. 10 is a horizontal sectional view of the chuck as shown in Fig. 7, particularly showing a mandrel secured in the chuck and engaging a swivel nut fitting held in the clamping jaws; and Fig. 11 is a perspective view of a filler block used to transmit torque from the driving member of the chuck to the mandrel, the filler block also being shown in Figs. 7–10.

Figure 1:
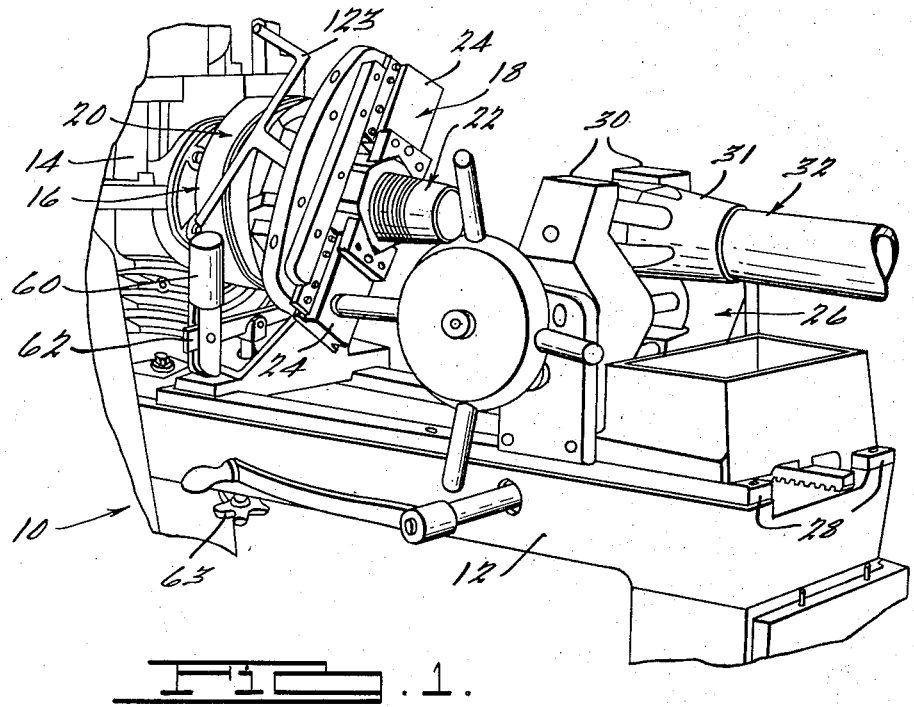
Figure 1 is a fragmentary, perspective view of a portable machine for attaching fittings to hoses, pipes and the like and including a chuck according to a preferred embodiment of the invention.
Figure 2:
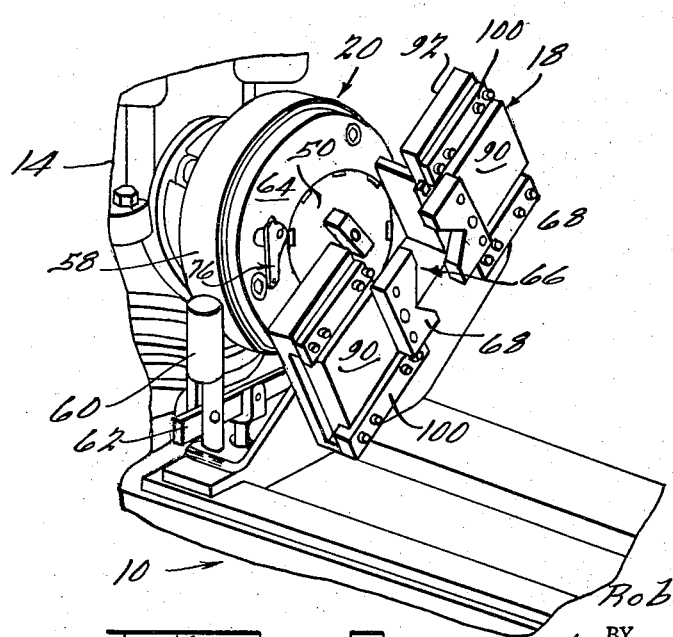
Fig. 2 is a fragmentary perspective view of the machine shown in Fig. 1, showing the chuck on a somewhat enlarged scale and with the fitting removed therefrom.

A chuck according to the present invention is well suited for use on a portable pipe and hose fitting attaching machine such as the machine 10 illustrated in Fig. 1. A machine of this type may be mounted upon a base 12 and carried by a vehicular trailer or the like for mobile use, or, if desired, may be permanently installed in a shop. An electric motor or other power source (not shown) may be mounted beneath the base 12 to drive the machine head 14. A chuck 16 according to the present invention is mounted upon the machine spindle 17 (Figs. 5 and 6) which projects forwardly from the head 14. The chuck 16 includes a body 20 which carries a forwardly spaced jaw assembly 18 in which a fitting 22 may be positioned for rotation by the chuck.

A travelling vise 26 is mounted on ways 28 upon the base 12 for longitudinal travel with respect to the machine head 14. The vise jaws 30 are arranged to clamp the socket 31 of a hose 32, or the like and to hold it in alignment with the chuck 16. In operation, the fitting 22 is first secured in the chuck 16, and the hose socket 31 is secured in the travelling vise 26. The vise 26 is moved toward the machine head 14 to bring the socket 31 into engagement with the fitting 22. The chuck is then rotated to screw the fitting 22 firmly into the socket.

The chuck of the present invention is well suited for use in this type of machine, but is not limited thereto, and may be used with equal advantage on other machines such as, for example, a conventional lathe. The over-all machine illustrated in Fig. 1 is not part of the present invention and is shown herein primarily to indicate the general mode of operation of one machine with which the chuck is especially well suited for use.

Referring now to Figs. 2 through 6, the chuck 16 comprises a body 20 which is mounted upon the spindle 17 of the machine head 14. The inner member 40 of the body is keyed to the spindle by a key 42, which fits within a pair of keyways 44 and 46 in the spindle 17 and in the inner member 40, respectively. The inner member 40 is preferably locked on the spindle 17 by a set screw 48 which bears upon the spindle in opposition to the key 42. A face plate, or driver 50 is rigidly fixed upon the inner member 40, as by three machine screws 52, for rotation therewith.

The body 20 also includes an outer member 54 rotatably mounted upon the inner member 40. In the embodiment shown, a pair of ball bearings 56 are mounted between the inner and outer members 40 and 54, respectively, to provide for accurately aligned smooth rotation of the outer member upon the inner member. A brake band 58 is positioned around the outer member 54 for selectively holding it against rotation. The brake band 58 may be conventionally controlled by a handle 60 (Fig. 3) which selectively raises and lowers a spring biased lever 62 to which one end of the brake band 58 is attached. The brake is disengaged when the handle 60 is raised, as shown in Fig. 1, and is engaged when the handle is lowered, as shown in Fig. 7, the brake tension being adjustable by means of a hand wheel 63 (Fig. 1).

A mounting plate 64 is attached to the outer member 54 for rotation therewith and carries the jaw assembly 18 spaced outwardly from the body 20. A generally U-shaped, relatively heavy steel channel member 66 is welded to the mounting plate 64, extending forwardly therefrom, and the jaw assembly 18 is secured to the forward end of the channel member 66. As perhaps best shown in Figs. 2 and 3, this arrangement provides ample space between the jaws 68, which grasp the fitting 22, and the body 20 of the chuck to accommodate the distal portion 70 of a fitting such as the L 22 illustrated. Additional openings in the channel member 66 may be provided as desired to accommodate various different types of fittings.

When the chuck is to be used with a fitting of the type that can be gripped directly by the jaws 68, the outer body member 54 is locked to the inner member 40 for direct drive thereby by means of a slidable key 72 (Figs 4 and 5) mounted in a radial slideway 73 in the mounting plate 64 and spring urged radially inwardly into engagement with one of several axial slots or notches 74 cut in the rim of the driver 50. The key 72 is actuatable by a lever 76 rotatably mounted forwardly of the mounting plate 64 upon a pin 78 which is fixed to the key 72 and extends through a radial slot 80 in the mounting plate 64. The lever 76 includes a cam-shaped portion 77 which bears against a pin 82 fixed in the mounting plate 64 so that when the lever is swung from one position to another it drives the key 72 outwardly against the urging of the biasing spring 84 away from the face plate 50, or, conversely, allows the key 72 to be driven into one of the notches 74 by the spring 84.

This particular coupling arrangement is not critical in the practice of the present invention, and any other desired equivalent arrangement may be substituted therefor. It is only necessary to provide a releasable direct drive coupling between the inner and outer members 40 and 54, respectively.

For attaching fittings of this first type, therefore, the entire body 20 of the chuck, together with the clamping jaw assembly 18 is rotated as a single unit by the machine spindle 17. The arrangement for attaching "swivel nut" couplings will be described presently, after the following description of the construction of the jaw assembly.

Referring now particularly to Figs. 4 and 5, the jaw assembly 18 comprises two opposed jaws 68, only one of which is shown in these figures, but which are symmetrically arranged about the axis of the chuck and are synchronously actuatable, being reciprocatable in opposition so that they always remain equidistant from the axis of the machine to hold a fitting in alignment therewith. The jaws 68 are preferably made of a hardened steel and are mounted upon slides 90 fitted in slideways 91 formed in a front face plate 92. The face plate 92 is of a wide U-shape and is rigidly bolted or otherwise secured upon fastening blocks 94 welded to the channel member 66. The slides 90 include flanges 96 (Fig. 3) and are retained in the slideways 91 by plates 100 fastened to the face plate 92 and extending over the flanges 96.

Actuating screws 104 are rotatably mounted transversely to the slideways 91 in slots 97 formed in the face plate 92. The screws 104 are mounted between thrust bearings (not separately designated) fixed in the face plate 92 at the ends of the slots 97, and are additionally supported by rear cover plates 106 fixed at the back of the face plate 92. A driving nut 102 is slidably fitted within each one of the slots 97 in engagement with the forward side of the screw 104, and is drivable along the slot 97 by the screw 104, being rigidly guided by the walls of the slot. The nut 102 carries an angularly offset projection 110, which fits within a similarly angularly offset groove 112 in the slide 90, so that travel of the nut 102 along the slot 97 is effective to drive the slide 90 perpendicularly to the screw axis, i.e., along the slideway 91.

The screws 104 are synchronously rotatable by a chain and sprocket arrangement. Sprockets 114 are fixed on the screws 104 and connected together by a chain 116, one reach of which is engaged by a central drive sprocket 118 (best shown in Fig. 6) mounted on the channel member 66. This sprocket 118 is fixed upon a rotatably mounted socket head pivot 122, which is adapted to receive a handcrank or wrench 123 (Fig. 1) for turning the sprocket 118 to drive the jaws 68 in and out.

The arrangement is relatively compact and simple in operation. The jaws 68 are actuated simultaneously through a single driving member, namely, the central sprocket 118, and are automatically synchronized through the drive chain 116. Also, the mechanical advantage is relatively high, so that the jaws, once set, do not tend to loosen their grip, but are effectively locked in position.

*Arrangement for attaching fittings of the swivel nut type*

Referring now to Figs. 7 through 11, the chuck 16 is readily adaptable for attaching fittings of the swivel nut type, the threaded nipples of which have no integral portions that may be gripped by the jaws 68 of the chuck. For attaching fittings of this type, a mandrel 130 is fitted on the chuck for rotational drive by the driver 50. The spindle 17 of the machine head 14 is hollow and a rod 132 is inserted through the bore 134 of the spindle to engage the mandrel 130. A filler block 136 is preferably used to reduce the needed weight and size of the mandrel 130, since different mandrels are required for couplings of different sizes. The filler block 136 slips over the rod 132 being supported thereby, and is keyed to the driver 50. The mandrel 130 is then threaded onto the end of the rod 132 and keyed to the filler block 136, both the filler block and the mandrel being drawn up against the driver 50 by the rod 132. The rod 132 carries an adjustable stop nut 133 (Fig. 9) which abuts the rearward end of the spindle 17 for limiting the forward travel of the rod. The rear end of the rod 132 is squared or otherwise shaped for engagement by a wrench or other tool for screwing the rod into the mandrel 130.

The mandrel 130 includes a threaded boss 138 proportioned to fit the internal thread of the swivel nut 140 of the fitting 142. It also includes a shoulder 144 spaced forwardly of the threaded boss 138 and positioned to engage the rearwardly facing flange 146 of the nipple 148 when the boss 138 is screwed into the nut 140. The mandrel is also provided with a forwardly extending nose or guide portion 150 proportioned to fit within the nipple 148 to assure proper alignment.

The driver 50 and the mandrel 130 are preferably provided with straight, rectangular keys, while the filler block 136, as best shown in Fig. 11, is preferably provided at both ends with wide angle keyways 160 to allow the mandrel 130 and filler block 136 to "float" with respect to the driver 50 to accommodate any dimensional inaccuracies or misalignments and to prevent binding when the mandrel is screwed into the fitting.

In operation, when the chuck is to be used for attaching a fitting of the swivel nut type, the coupling key 72 is retracted by swinging the lever 76 upwardly, as viewed in Fig. 4, to uncouple the outer body member 54 from the inner member 40. The brake handle 60 is lowered to the position illustrated in Fig. 7, to tighten the brake band 58 upon the outer member 54 to restrain the jaw assembly 18 from rotation. The filler block 136 and the mandrel 130 are fitted on the rod 132, and the free-spinning nut 140 of the fitting is manually threaded loosely upon the mandrel. The mandrel 130 is dimensioned so that as soon as the nut 140 is started upon the threaded boss 138, the nut is positioned between the jaws 68. The jaws 68 are then advanced into loose-fitting engagement with the nut, close enough to hold the nut against turning, but sufficiently loose to permit the nut to slide freely axially as it is threaded the rest of the way upon the mandrel.

The machine is then driven, rotating the inner member 40 together with the mandrel 130 while the clamping jaws are held stationary, so that the nut 140 is drawn up tight upon the threaded boss 138 of the mandrel. The shoulder 144 of the mandrel is driven into the fitting, wedging the flange 152 of the nipple against the bottom flange 154 of the nut until the retarding force of the brake 58 is overcome and the inner and outer members 40 and 54, respectively, rotate together. The nipple 148 may then be screwed into the hose socket 31, the brake 58 preferably being released after the mandrel 130 is driven fully into the nut 140. After the fitting is screwed fully into the hose, the brake 58 is again tightened and the machine is driven in reverse to extract the mandrel from the nut. Additional brake pressure may be provided, if the mandrel 130 is bound too tightly in the fitting, by pressing downwardly upon the brake handle 60.

What is claimed is:

1. A chuck for screwing a fitting onto a threaded pipe or hose comprising a driving member, a driven member coaxially mounted on and freely rotatable with respect to said driving member, a jaw assembly carried by said driven member and fixed thereto, and releasable coupling means for coupling said driven member to said driving member for rotation therewith.

2. A chuck for screwing a fitting onto a threaded pipe or hose comprising a driving member, a driven member coaxially mounted on and freely rotatable with respect to said driving member, a jaw assembly carried by said driven member and fixed thereto, releasable coupling means for coupling said driven member to said driving member for rotation therewith, and braking means for holding said driven member against rotation when said coupling means are released.

3. A chuck for screwing a fitting onto a threaded pipe or hose comprising a driving member, a driven member coaxially mounted on and freely rotatable with respect to said driving member, a jaw assembly carried by said driven member and fixed thereto, releasable coupling means for coupling said driven member to said driving member for rotation therewith, braking means for holding said driven member against rotation when said coupling means are released, and means for mounting a mandrel coaxially upon said driving member for rotational drive thereby.

4. A chuck for screwing a fitting or the like upon a pipe or hose comprising a drive member for attachment to the spindle of a machine or the like, a driven member coaxially mounted on and rotatable with respect to said drive member, a jaw assembly rigidly secured to said driven member and axially spaced therefrom, coupling means for releasably locking said driven member to said drive member for direct drive thereby, and means for coupling said driven member to said drive member through a workpiece held in said jaw assembly so that said driven member and said jaw assembly may be rotatably driven by said drive member through said workpiece when said releasable coupling means is released.

5. A chuck for screwing fitting on pipe or hose comprising a central drive member for attachment to a machine spindle or the like, an annular driven member axially mounted on and rotatable with respect to said drive member, a coupling element for releasably coupling said driven member to said drive member for positive drive thereby, means for selectively engaging and disengaging said coupling element, a brake engageable with said driven member for restraining said driven member against rotation when said coupling element is disengaged, a jaw assembly rigidly mounted on and axially spaced from said driven member and adapted to releasably hold a workpiece in coaxial alignment with said drive member, means for removably mounting a mandrel in a position to engage and to be threaded into a workpiece held by said jaw assembly, and means for coupling said mandrel to said drive member for rotational drive thereby.

6. A chuck for screwing fittings on pipe or hose comprising a body adapted for mounting upon the spindle of a machine or the like, said body having an inner member and an outer member in coaxial alignment therewith and rotatable with respect thereto, a jaw assembly fixed upon said outer member for rotation therewith, said jaw assembly including a face plate defining a pair of radially aligned slideways, a pair of jaws slidable in said slideways, a rotatable member positioned adjacent to each one of said jaws, means for driving said jaws radially towards and away from each other in response to rotation of said rotatable members, and means for coupling said rotatable members together for synchronous drive.

7. A chuck for screwing a fitting onto a threaded pipe, hose or the like comprising a body to be mounted upon the spindle of a machine, said body having an inner member and an outer member in coaxial alignment therewith and rotatable with respect thereto, a jaw assembly fixed upon said outer member for rotation therewith, said jaw assembly including a face plate defining a pair of diametrically opposite slideways, a pair of jaws slidable in said slideways, a pair of screws rotatably mounted on said face plate transversely with respect to said slideways, each one of said screws being adjacent to a different one of said jaws, each one of said jaws defining a slot facing the screw adjacent thereto, said slots being angularly off-set with respect to said screws, drive members for driving said jaws radially towards and away from each other in response to rotation of said screws, each one of said drive members including a threaded portion in engagement with one of said screws and a projection positioned in the slot defined by one of said jaws, guide means for guiding said drive members in paths generally parallel to the axes of said screws, drive sprockets fixed upon said screws for rotation therewith, a drive chain trained between and connecting said drive sprockets, and means for driving said drive chain to rotate said drive sprockets and said screws thereby to drive said jaws radially towards and away from each other in synchronism.

8. A clamping jaw assembly of the type having synchronously actuatable opposed jaws comprising a frame defining a pair of slideways aligned in opposition and disposed on opposite respective sides of a predetermined axis, a pair of clamping jaws mounted on said frame for travel along said slideways, each one of said jaws defining a slot extending diagonally across the slideway, a pair of screws rotatably mounted on said frame adjacent to said slideways and perpendicularly to the direction of travel of said jaws, follower nuts fitted on said screws and including projecting portions extending into said diagonal slots, means for holding said nuts against rotation so that in response to rotation of said screws they are driven across said slideways and cam said jaws toward or away from each other depending on the direction of rotation of said screws, and means for coupling said screws together for synchronous drive whereby said jaws may be always maintained at substantially equal distances from said predetermined axis.

References Cited in the file of this patent

UNITED STATES PATENTS

| | | |
|---|---|---|
| 2,602,673 | Deuring et al. | July 8, 1952 |
| 2,627,108 | Kludt et al. | Feb. 3, 1953 |